(12) United States Patent
Goupil et al.

(10) Patent No.: US 10,809,804 B2
(45) Date of Patent: Oct. 20, 2020

(54) HAPTIC FEEDBACK GLOVE

(71) Applicant: HAPTX, INC., Seattle, WA (US)

(72) Inventors: Marc Y. Goupil, San Luis Obispo, CA (US); Bodin L. Rojanachaichanin, San Luis Obispo, CA (US); Kurt C. Sjoberg, San Luis Obispo, CA (US); Paul Piller, Los Angeles, CA (US); Nicholas J. Bonafede, Jr., San Diego, CA (US); Ryan M. Takatsuka, San Luis Obispo, CA (US)

(73) Assignee: HAPTX, INC., Seattle, WA (US)

( * ) Notice: Subject to any disclaimer, the term of this patent is extended or adjusted under 35 U.S.C. 154(b) by 0 days.

(21) Appl. No.: 16/235,588

(22) Filed: Dec. 28, 2018

(65) Prior Publication Data

US 2019/0204921 A1    Jul. 4, 2019

Related U.S. Application Data

(60) Provisional application No. 62/612,185, filed on Dec. 29, 2017.

(51) Int. Cl.
*G09G 5/00*    (2006.01)
*G06F 3/01*    (2006.01)

(52) U.S. Cl.
CPC .............. *G06F 3/016* (2013.01); *G06F 3/014* (2013.01)

(58) Field of Classification Search
CPC ................................. G06F 3/014; G06F 3/016
See application file for complete search history.

(56) References Cited

U.S. PATENT DOCUMENTS

| | | | |
|---|---|---|---|
| 5,184,319 A | 2/1993 | Kramer |
| 5,512,919 A | 4/1996 | Araki |
| 5,631,861 A | 5/1997 | Kramer |
| 5,898,599 A | 4/1999 | Massie |
| 5,961,541 A | 10/1999 | Ferrati |
| 5,963,891 A | 10/1999 | Walker |
| 5,980,256 A | 11/1999 | Carmein |
| 6,070,269 A | 6/2000 | Tardif |
| 6,128,004 A | 10/2000 | McDowall |

(Continued)

FOREIGN PATENT DOCUMENTS

| | | |
|---|---|---|
| DE | 4422971 C2 | 9/2003 |
| JP | 2012074076 | 4/2012 |

(Continued)

OTHER PUBLICATIONS

Communication Pursuant to Rule 164(1) EPC and Supplementary Partial European Search Report for European Patent Application No. 14819570.4 mailed from the European Patent Office dated Sep. 26, 2016.

(Continued)

*Primary Examiner* — Insa Sadio
(74) *Attorney, Agent, or Firm* — Fitch, Even, Tabin & Flannery LLP

(57) ABSTRACT

A haptic feedback glove may include an inner glove made of a flexible material, thimbles over each finger and thumb, and tendons coupled to each finger thimble. One or more actuators may be connected to each tendon, so that the tendons may be used to apply pressure to the fingers. Tactors in the finger thimbles and on palm panels may also be used to provide haptic feedback.

19 Claims, 18 Drawing Sheets

(56) References Cited

U.S. PATENT DOCUMENTS

| | | | |
|---|---|---|---|
| 6,135,928 | A | 10/2000 | Butterfield |
| 6,141,497 | A | 10/2000 | Reinicke |
| 6,386,507 | B2 | 5/2002 | Dhuler |
| 6,435,794 | B1 | 8/2002 | Springer |
| 6,521,188 | B1 | 2/2003 | Webster |
| 7,011,378 | B2 | 3/2006 | Maluf |
| 7,046,151 | B2 | 5/2006 | Dundon |
| 7,138,976 | B1 | 11/2006 | Bouzit |
| 7,159,618 | B2 | 1/2007 | Broyer |
| 7,258,774 | B2 | 8/2007 | Chou |
| 7,409,882 | B2 | 8/2008 | Massimo |
| 7,918,808 | B2 | 4/2011 | Simmons |
| 7,972,718 | B2 | 7/2011 | Bailey |
| 8,046,408 | B2 | 10/2011 | Torabi |
| 8,096,322 | B2 | 1/2012 | Vallet |
| 8,140,339 | B2 | 3/2012 | Hernandez-Rebollar |
| 8,156,964 | B2 | 4/2012 | Welle |
| 9,652,037 | B2 | 5/2017 | Rubin |
| 9,904,358 | B2 | 2/2018 | Rubin |
| 10,222,859 | B2 | 3/2019 | Rubin |
| 2001/0003712 | A1 | 6/2001 | Roelofs |
| 2003/0025595 | A1 | 2/2003 | Langberg |
| 2003/0030397 | A1 | 2/2003 | Simmons |
| 2003/0115954 | A1 | 6/2003 | Zemlyakov |
| 2006/0017654 | A1 | 1/2006 | Romo |
| 2006/0115348 | A1 | 6/2006 | Kramer |
| 2007/0225620 | A1 | 9/2007 | Carignan |
| 2008/0102991 | A1 | 5/2008 | Hawkins |
| 2009/0248202 | A1 | 10/2009 | Osuka |
| 2009/0250267 | A1 | 10/2009 | Heubel |
| 2009/0312817 | A1 | 12/2009 | Hogle |
| 2010/0093559 | A1 | 4/2010 | Fan |
| 2010/0165784 | A1 | 7/2010 | Jovanovich |
| 2011/0016609 | A1 | 1/2011 | Phelps |
| 2011/0023970 | A1 | 2/2011 | Rapp |
| 2011/0067157 | A1 | 3/2011 | Xiao |
| 2012/0065026 | A1 | 3/2012 | Land |
| 2012/0156661 | A1 | 6/2012 | Smith |
| 2013/0158444 | A1 | 6/2013 | Herr |
| 2013/0231595 | A1 | 9/2013 | Zoss |
| 2014/0277739 | A1 | 9/2014 | Kornbluh |
| 2014/0358290 | A1 | 12/2014 | Kazerooni |
| 2015/0040288 | A1 | 2/2015 | Gaff |
| 2015/0289995 | A1 | 10/2015 | Wilkinson |
| 2015/0321339 | A1 | 11/2015 | Asbeck |
| 2016/0041581 | A1 | 2/2016 | Piccionelli |
| 2016/0139666 | A1 | 5/2016 | Rubin |
| 2016/0246369 | A1* | 8/2016 | Osman ................. A63F 13/212 |
| 2016/0259417 | A1 | 9/2016 | Gu |
| 2016/0266645 | A1 | 9/2016 | Marozau |
| 2016/0342209 | A1* | 11/2016 | Provancher ............ G06F 3/016 |
| 2017/0083085 | A1 | 3/2017 | Rubin |
| 2017/0131769 | A1 | 5/2017 | Keller et al. |
| 2017/0131770 | A1 | 5/2017 | Keller et al. |
| 2017/0160807 | A1 | 6/2017 | Keller |
| 2017/0168565 | A1 | 6/2017 | Cohen |
| 2017/0168576 | A1 | 6/2017 | Keller |
| 2017/0178471 | A1 | 6/2017 | Levesque |
| 2017/0242477 | A1 | 8/2017 | Rubin |
| 2017/0300115 | A1 | 10/2017 | Kerr |
| 2018/0179051 | A1 | 6/2018 | Keller |
| 2018/0322444 | A1 | 11/2018 | Todeschini |
| 2018/0335841 | A1 | 11/2018 | Rubin |
| 2018/0335842 | A1 | 11/2018 | Rubin |

FOREIGN PATENT DOCUMENTS

| | | |
|---|---|---|
| KR | 20100091382 | 8/2010 |
| KR | 1020130086235 | 7/2013 |
| KR | 1020130101367 | 9/2013 |
| WO | 2010025409 | 3/2010 |
| WO | 2010049092 | 5/2010 |

OTHER PUBLICATIONS

Dexta Robotics; "Exoskeleton Glove Adds Physical Experience to Virtual Reality (Video)";Yahoo Tech; https://www.yahoo.com/tech/exoskeleton-glove-adds-physical-experience-to-virtual-reality; Aug. 24, 2016; downloaded Aug. 30, 2016; pp. 1 and 2.

Extended European Search Report for European Patent Application No. 14819570.4 mailed from the European Patent Office dated Jan. 16, 2017.

Grover et al; "Development and Multiplexed Control of Latching Pneumatic Valves Using Microfluidic Logical Structures"; Lab Chip; Apr. 6, 2006; pp. 623-631.

International Search Report and Written Opinion of the International Searching Authority for PCT/US14/44735 dated Dec. 17, 2014.

King et al; "A Pneumatic Haptic Feedback Actuator Array for Robotic Surgery or Simulation"; Medicine Meets Virtual Reality 15; IOS Press, 2007; pp. 217-222.

Leithinger et al; "inFORM"; MIT Media Lab Tangible Media Group; 2013; http://tangible.media.mit.edu/project/inform/; downloaded Jun. 1, 2016; 2 pages.

Morales; "Pneumatic Multiplexer—3d printed"; Instructables; http://www.instructables.com/id/Pneumatic-Multiplexer/; 2016 Autodesk, Inc.; downloaded Jun. 7, 2016; 6 pages.

PCT; International Search Report and Written Opinion of the International Searching Authority for PCT/US2018/030106 mailed from the International Searching Authority dated Aug. 14, 2018.

Rubin; U.S. Appl. No. 14/981,414, filed Dec. 28, 2015.

Rubin; U.S. Appl. No. 15/372,362, filed Dec. 7, 2016.

Rubin; U.S. Appl. No. 15/591,019, filed May 9, 2017.

Rubin; U.S. Appl. No. 15/599,470, filed May 19, 2017.

Rubin; U.S. Appl. No. 15/599,471, filed May 19, 2017.

Rubin; U.S. Appl. No. 16/245,145, filed Jan. 10, 2019.

Someya; "Building Bionic Skin, How Flexible Electronics Can Provide E-Skins for Human Spectrum"; IEEE.Org; Sep. 2013; pp. 51-56.

USPTO; Non-final Office Action issued in U.S. Appl. No. 14/981,414 dated Oct. 6, 2016.

USPTO; Non-Final Office Action issued in U.S. Appl. No. 15/591,019 dated Apr. 3, 2018.

USPTO; Non-Final Office Action issued in U.S. Appl. No. 15/599,471 dated Sep. 19, 2018.

USPTO; Non-Final Office Action issued in U.S. Appl. No. 15/599,470 dated Oct. 10, 2018.

USPTO; Notice of Allowance issued in U.S. Appl. No. 15/372,362 dated Oct. 11, 2017.

USPTO; Notice of Allowance issued in U.S. Appl. No. 15/591,019 dated Nov. 14, 2018.

USPTO; Notice of Allowance issued in U.S. Appl. No. 14/981,414 dated Mar. 10, 2017.

USPTO; Non-Final Office Action issued in U.S. Appl. No. 16/245,145 dated Jan. 9, 2020.

Communication Pursuant to Article 94(3) EPC for European Patent Application No. 14819570.4 mailed from the European Patent Office dated Jan. 23, 2020.

USPTO; Final Office Action issued in U.S. Appl. No. 15/599,471 dated Apr. 16, 2019.

PCT; International Search Report and Written Opinion of the International Searching Authority for PCT/US2018/067941 dated Apr. 23, 2019.

USPTO; Final Office Action issued in U.S. Appl. No. 15/599,470 dated May 1, 2019.

USPTO; Notice of Allowance issued in U.S. Appl. No. 16/245,145 dated May 28, 2020.

* cited by examiner

HAPTIC FEEDBACK GLOVE

This application claims the benefit of U.S. Provisional Application No. 62/612,185, filed Dec. 29, 2017, for HAPTIC FEEDBACK GLOVE, which is incorporated in its entirety herein by reference.

BACKGROUND OF THE INVENTION

1. Field of the Invention

The present invention relates generally to providing haptic feedback, and more specifically to providing haptic feedback to a hand using a glove.

2. Discussion of the Related Art

Various systems and processes are known in the art for providing haptic feedback. Haptic feedback systems interact with a user's sense of touch by applying mechanical forces, vibrations, or motions. Haptic stimulation can be used to create or interact with virtual objects in a computer simulation, and to enhance the remote control of machines and devices. Haptic devices may incorporate tactile sensors that measure forces exerted by the user on the interface.

In some cases, haptic feedback systems may be bulky, heavy, insufficiently interactive, or insufficiently sensitive. This may prevent natural seeming interactions between a user and virtual environments or robotic devices.

SUMMARY

A haptic feedback glove may include an inner glove made of a flexible material, thimbles over each finger and thumb, and tendons coupled to each finger thimble. One or more actuators may be connected to each tendon, so that the tendons may be used to apply pressure to the fingers. Tactors in the finger thimbles and on palm panels may also be used to provide haptic feedback.

In one embodiment, a haptic feedback glove may include a plurality of fingers and a thumb comprising a flexible fabric material, at last one finger thimble juxtaposed with a tip region of a respective at least one of the plurality of fingers, at least one tendon coupled to a respective one of the at least one finger thimble at a respective distal end of the at least one tendon, at least one actuator coupled respectively to a respective proximal end of the at least one tendon, at least one tendon guide coupled respectively to said at least one tendon between the respective distal end the respective proximal end, and coupled to the respective at least one of the plurality of fingers other that at the tip region of the respective at least one of the plurality of fingers, and a plurality of finger tactors interposed between the respective at least one finger of the plurality of fingers at a respective one of the at least one finger thimble, at least two of which plurality of finger tactors are independently actuatable from one another.

A method of providing a system for providing haptic feedback is described. The method may include providing a plurality of fingers and a thumb comprising a flexible fabric material, providing at last one finger thimble juxtaposed with a tip region of a respective at least one of the plurality of fingers, providing at least one tendon coupled to a respective one of the at least one finger thimble at a respective distal end of the at least one tendon, providing at least one actuator coupled respectively to a respective proximal end of the at least one tendon, providing at least one tendon guide coupled respectively to said at least one tendon between the respective distal end the respective proximal end, and coupled to the respective at least one of the plurality of fingers other that at the tip region of the respective at least one of the plurality of fingers, and providing a plurality of finger tactors interposed between the respective at least one finger of the plurality of fingers at a respective one of the at least one finger thimble, at least two of which plurality of finger tactors are independently actuatable from one another.

A method of providing haptic feedback is described. The method may include using a plurality of fingers and a thumb comprising a flexible fabric material, using at last one finger thimble juxtaposed with a tip region of a respective at least one of the plurality of fingers, using at least one tendon coupled to a respective one of the at least one finger thimble at a respective distal end of the at least one tendon, using at least one actuator coupled respectively to a respective proximal end of the at least one tendon, using at least one tendon guide coupled respectively to said at least one tendon between the respective distal end the respective proximal end, and coupled to the respective at least one of the plurality of fingers other that at the tip region of the respective at least one of the plurality of fingers, and using a plurality of finger tactors interposed between the respective at least one finger of the plurality of fingers at a respective one of the at least one finger thimble, at least two of which plurality of finger tactors are independently actuatable from one another.

Some examples of the haptic feedback glove described above may also include a palm coupled to the plurality of fingers comprising the flexible fabric material. Some examples of the haptic feedback glove described above may also include a plurality of palm tactors coupled to the palm, at least two of which plurality of palm tactors may be independently actuatable from one another.

Some examples of the haptic feedback glove described above may also include a back coupled to the plurality of fingers. Some examples of the haptic feedback glove described above may also include a positional tracker coupled to the back configured to wirelessly communicate a position in three-dimensional space of a hand.

Some examples of the haptic feedback glove described above may also include at least one finger position sensor coupled to a respective one of the plurality of fingers configured to wirelessly communicate a position of the respective one the plurality of fingers.

In some examples of the haptic feedback glove described above, the at least one finger position sensor may be coupled to a respective one of the at least one finger thimble.

Some examples of the haptic feedback glove described above may also include at least one palm sensor coupled to a palm, wherein the at least one palm sensor may be configured to wirelessly communicate a position of the palm.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth.

In other instances, well-known structures, materials, or operations are not shown or described in detail to avoid obscuring aspects of the invention. A haptic feedback glove may include a soft glove made of a flexible material, thimbles over each finger and thumb, and tendons coupled to each finger thimble. One or more actuators may be connected to each tendon, so that the tendons may be used to apply pressure to the fingers. Tactors in the finger thimbles and on palm panels may also be used to provide haptic feedback.

Figure 1:
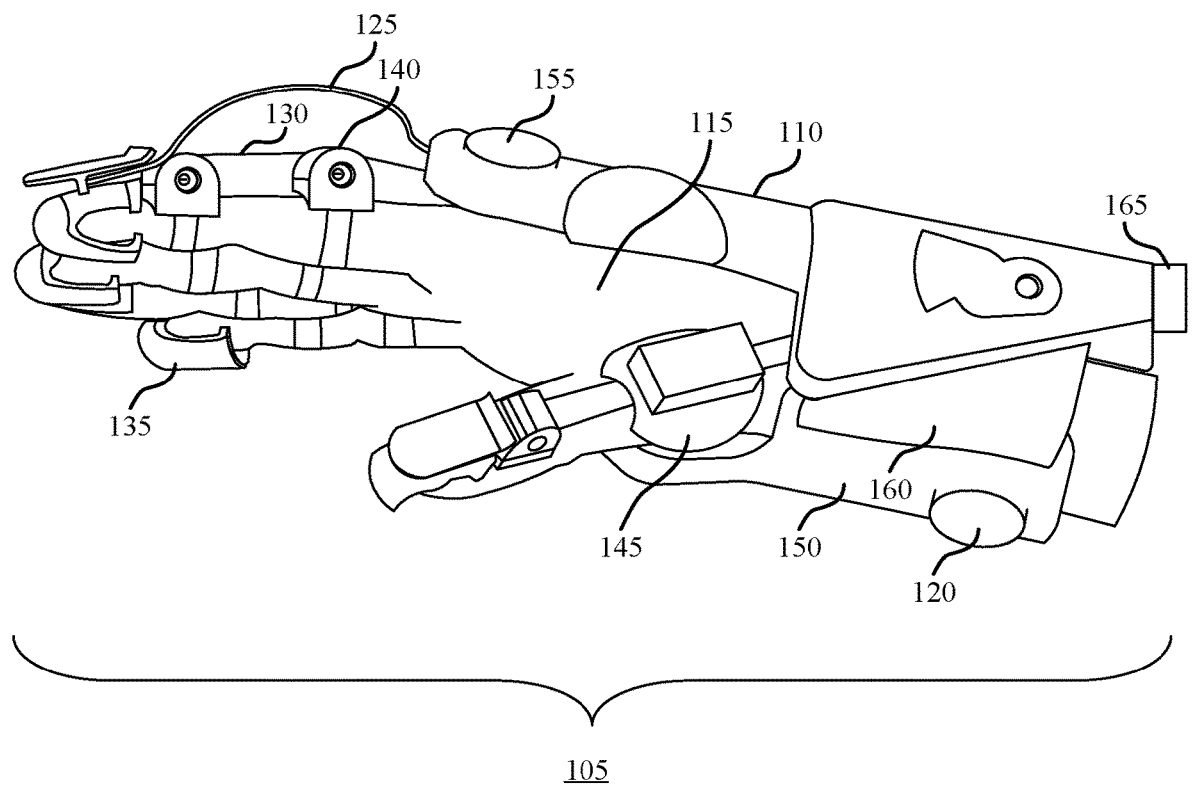
FIG. 1 illustrates an example of a haptic feedback glove in accordance with aspects of the present disclosure.

FIG. 1 illustrates an example of a haptic feedback glove 105 in accordance with aspects of the present disclosure. In some examples, haptic feedback glove 105 may include main case 110, soft glove 115, wrist lacer 120, panel routing 125, tendons 130, thimbles 135, tendon guides 140, thumb actuator housing 145, shank 150, palm lacer 155, wrist strap 160, and umbilical 165.

A haptic feedback glove 105 may utilize flexible, silicone-based smart textiles that contain an array of high-displacement pneumatic actuators and embedded microfluidic air channels.

A haptic feedback glove 105 may include a lightweight force-feedback exoskeleton, which may be powered by microfluidic actuation. High-power-density, microfluidic actuators may enable an ultra-lightweight hand exoskeleton that may apply up to five pounds of resistance to each finger. These resistive forces may complement the haptic feedback produced by the smart textile, enhancing the perception of size, shape, and weight of virtual objects.

The hand fit of a haptic feedback glove 105 may depend on the length and breadth of the hand. A glove may have hand size ranges where it fits hands well, poorly, and not at all, i.e., a recommended fit range, an expanded fit range, and a no-fit range. In some cases, software may be utilized that prevents a user from operating a glove that is too small in order to prevent discomfort or injury to the user and damage to the glove. In some cases, a haptic feedback glove 105 may be manufactured in various sizes to accommodate different size hands.

Main case 110 may be an example of, or incorporate aspects of, main case 1015 and 1605 as described with reference to FIGS. 10 and 16.

Soft glove 115 may be an example of, or incorporate aspects of, soft glove 705 as described with reference to FIG. 7.

Wrist lacer 120 may be an example of, or incorporate aspects of, wrist lacer 910 as described with reference to FIG. 9.

Tendon 130 may be an example of, or incorporate aspects of, tendon 205, 305, and 425 as described with reference to FIGS. 2, 3, and 4.

Tendon 130 may be an example of at least one component coupled to a respective one of the at least one finger thimble 135 at a respective distal end of the at least one tendon 130.

Thimble 135 may be an example of, or incorporate aspects of, thimble 215, 315, and 430 as described with reference to FIGS. 2, 3, and 4. Thimble 135 may be an example of a finger component juxtaposed with a tip region of a respective at least one of the plurality of fingers.

Tendon guide 140 may be an example of, or incorporate aspects of, tendon guide 210 and 310 as described with reference to FIGS. 2 and 3. Tendon guide 140 may be coupled respectively to the at least one tendons 130 between the respective distal end the respective proximal end, and coupled to the respective at least one of the plurality of fingers other that at the tip region of the respective at least one of the plurality of fingers.

Thumb actuator housing 145 may be an example of, or incorporate aspects of, thumb actuator housing 320 as described with reference to FIG. 3.

Shank 150 may be an example of, or incorporate aspects of, shank 920 as described with reference to FIG. 9.

Palm lacer 155 may be an example of, or incorporate aspects of, palm lacer 925 and 1005 as described with reference to FIGS. 9 and 10.

Wrist strap 160 may be an example of, or incorporate aspects of, wrist strap 905 as described with reference to FIG. 9.

Figure 2:
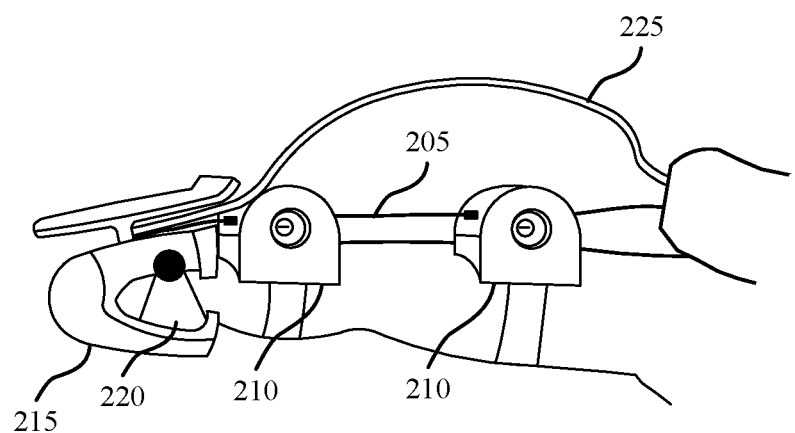
FIG. 2 illustrates an example of a finger assembly in accordance with aspects of the present disclosure.

FIG. 2 illustrates an example of a finger assembly in accordance with aspects of the present disclosure. FIG. 2 includes illustrations of tendon 205, tendon guide 210, thimble 215, finger panel 220, and sensor 225.

Tendon 205 may be an example of, or incorporate aspects of, tendon 130, 305, and 425 as described with reference to FIGS. 1, 3, and 4.

Tendon guide 210 may be an example of, or incorporate aspects of, tendon guide 140 and 310 as described with reference to FIGS. 1 and 3.

Thimble 215 may be an example of, or incorporate aspects of, thimble 135, 315, and 430 as described with reference to FIGS. 1, 3, and 4.

Finger panel 220 may be an example of, or incorporate aspects of, finger panel 415 and 605 as described with reference to FIGS. 4, 6A and 6B.

Figure 3:
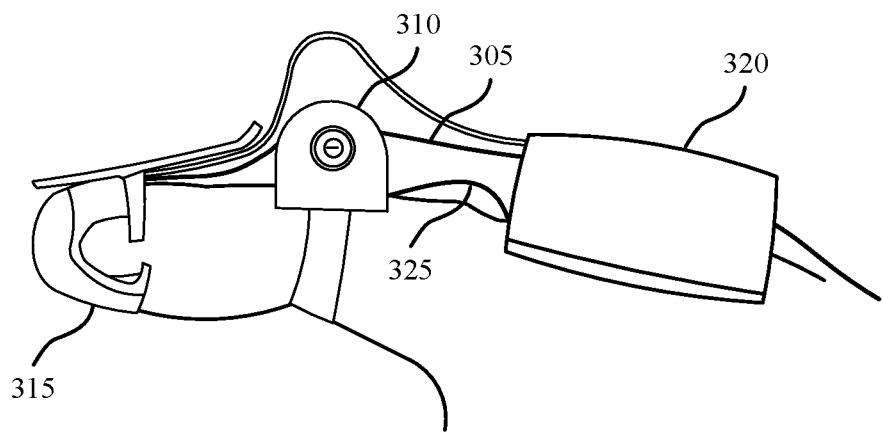
FIG. 3 illustrates an example of a thumb assembly in accordance with aspects of the present disclosure.

FIG. 3 illustrates an example of a thumb assembly in accordance with aspects of the present disclosure. FIG. 3 includes illustrations of tendon 305, tendon guide 310, thimble 315, thumb actuator housing 320, and reaction strap 325.

Tendon 305 may be an example of, or incorporate aspects of, tendon 130, 205, and 425 as described with reference to FIGS. 1, 2, and 4.

Tendon guide 310 may be an example of, or incorporate aspects of, tendon guide 140 and 210 as described with reference to FIGS. 1 and 2.

Thimble 315 may be an example of, or incorporate aspects of, thimble 135, 215, and 430 as described with reference to FIGS. 1, 2, and 4.

Thumb actuator housing 320 may be an example of, or incorporate aspects of, thumb actuator housing 145 as described with reference to FIG. 1.

Figure 4:
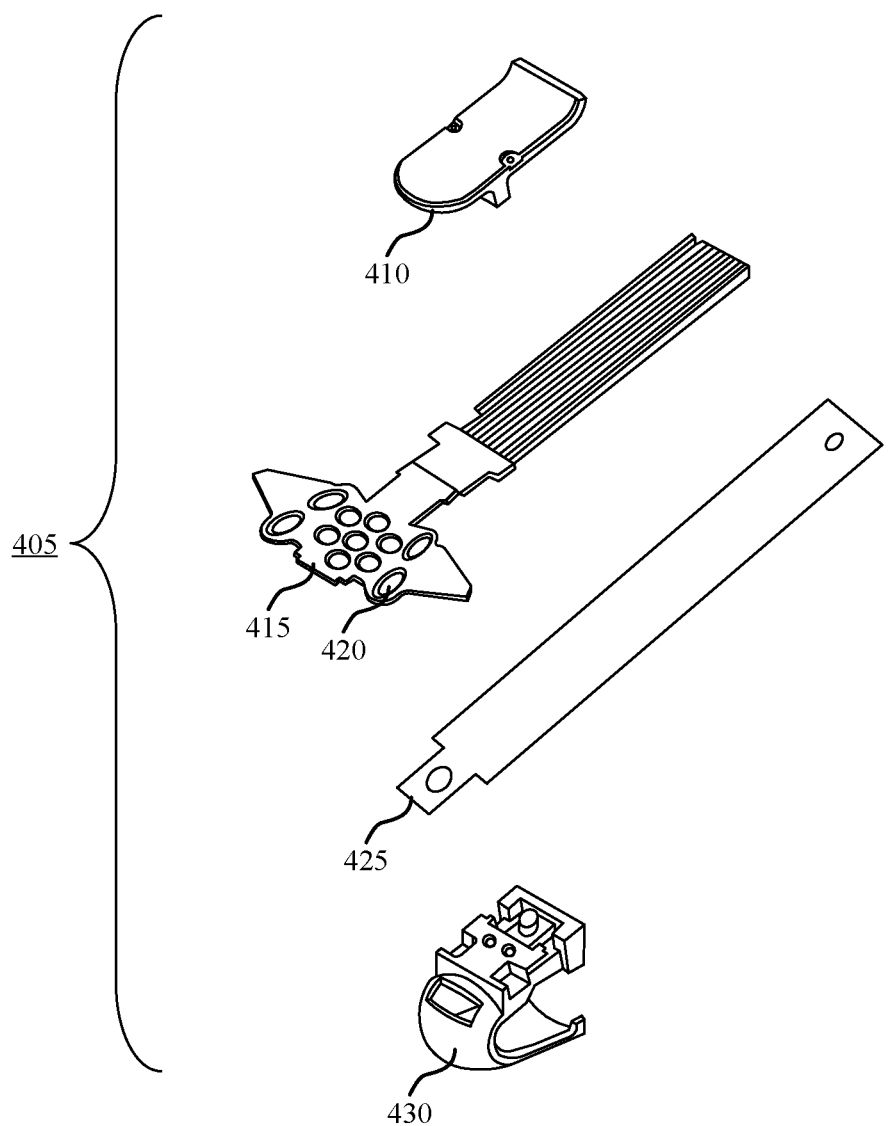
FIG. 4 illustrates an example of a fingertip assembly in accordance with aspects of the present disclosure.

FIG. 4 illustrates an example of a fingertip assembly 405 in accordance with aspects of the present disclosure. In some examples, fingertip assembly 405 may include fingernail 410, finger panel 415, tendon 425, and thimble 430.

Finger panel 415 may be an example of, or incorporate aspects of, finger panel 220 and 605 as described with reference to FIGS. 2, 6A and 6B. In some examples, finger panel 415 may include tactors 420.

Tactors 420 may be an example of, or incorporate aspects of, tactors 610 as described with reference to FIG. 6. Tactors 420 may be an example of a plurality of finger tactors interposed between the respective at least one finger of the plurality of fingers at a respective one of the at least one finger thimble 430, at least two of which plurality of finger tactors are independently actuatable from one another and be an example of a plurality of palm tactors coupled to the palm, at least two of which plurality of palm tactors are independently actuatable from one another.

Tactors 420 may provide haptic feedback by pushing against the user's skin, displacing it the same way a real object would when touched. High-performance, miniature valves accurately control the pressure of each tactor 420 to create a virtually infinite variety of sensations—texture, size, shape, movement, and more. In some cases, a second layer of microchannels can add temperature feedback by delivering variations of hot and cold water.

Tendon 425 may be an example of, or incorporate aspects of, tendon 130, 205, and 305 as described with reference to FIGS. 1, 2, and 3.

Thimble 430 may be an example of, or incorporate aspects of, thimble 135, 215, and 315 as described with reference to FIGS. 1, 2, and 3. In some cases, the fingernail 410 may contain one or more sensors.

Figure 5:
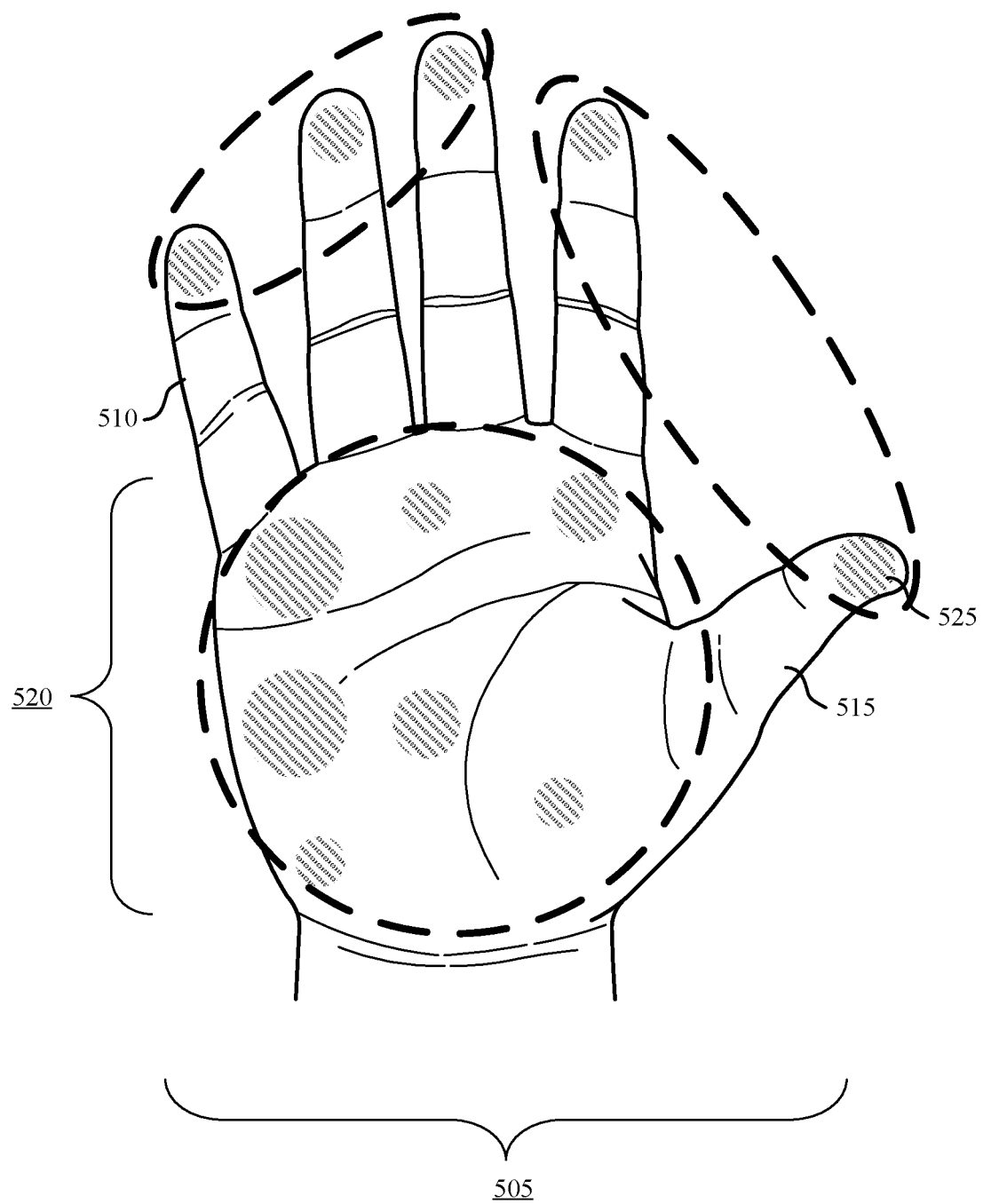
FIG. 5 illustrates an example of a tactor layout in accordance with aspects of the present disclosure.

FIG. 5 illustrates an example of a tactor layout that supports providing haptic feedback to a hand 505 using a glove in accordance with aspects of the present disclosure. FIG. 5 includes illustrations of hand 505 and tactor locations 525.

The tactor layout illustrated in FIG. 5 may represent a means of achieving a desirable level of haptic feedback, including a threshold level of edge perception. One measure of performance of a haptic feedback glove may be referred to as edge perception. Edge perception is a measure of the minimum distance that may be perceived in a change in the position of a virtual edge. Edge perception may be measured at various locations on a hand 505 or finger, and may be different at each location. In some cases, the edge perception at a given location may be based at least in part on a number or density of tactors at that location. For example, the number of tactors may be different for different fingers 510, and for different locations on the palm 520 of the hand 505.

In some cases, a haptic feedback glove may include a higher number or density of tactors on the thumb 515 and index finger than on the remaining fingers 510. The tactors may be located on the fingertips, or on the side of the fingertips. Side tactors may facilitate haptic feedback associated with lateral interactions.

Hand 505 may be an example of, or incorporate aspects of, hand 805 as described with reference to FIGS. 8A and 8B. In some examples, hand 505 may include fingers 510, thumb 515, and palm 520.

Fingers 510 may be an example of a plurality of component and a thumb 515 comprising a flexible fabric material.

Figure 6A:
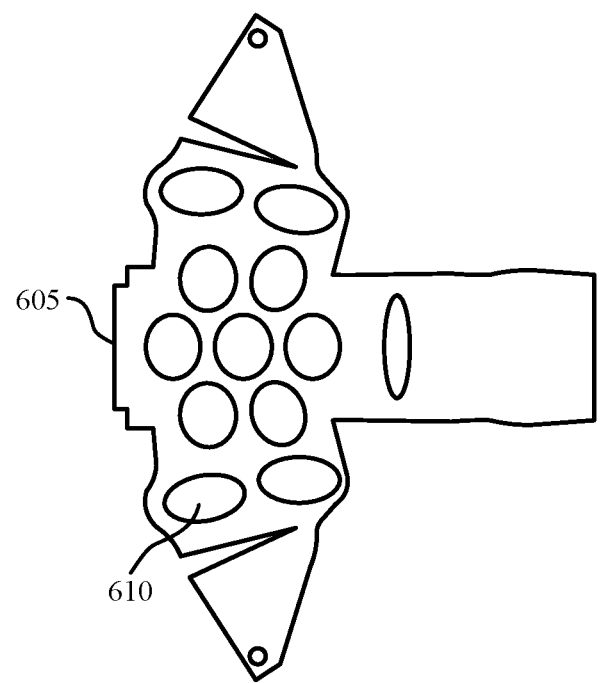
FIGS. 6A and 6B illustrate an example of a tactor arrangement in accordance with aspects of the present disclosure.
Figure 6B:
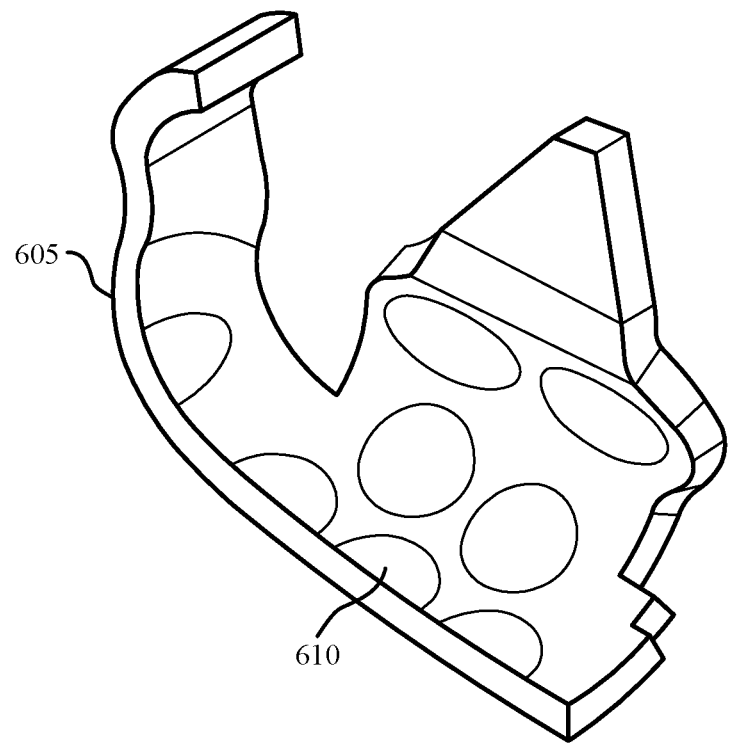

FIGS. 6A and 6B illustrate an example of a tactor 610 arrangement in accordance with aspects of the present disclosure.

Finger panel 605 may be an example of, or incorporate aspects of, finger panel 220 and 415 as described with reference to FIGS. 2 and 4. In some examples, finger panel 605 may include tactors 610.

Tactors 610 may be an example of, or incorporate aspects of, tactors 420 as described with reference to FIG. 4.

Figure 7:
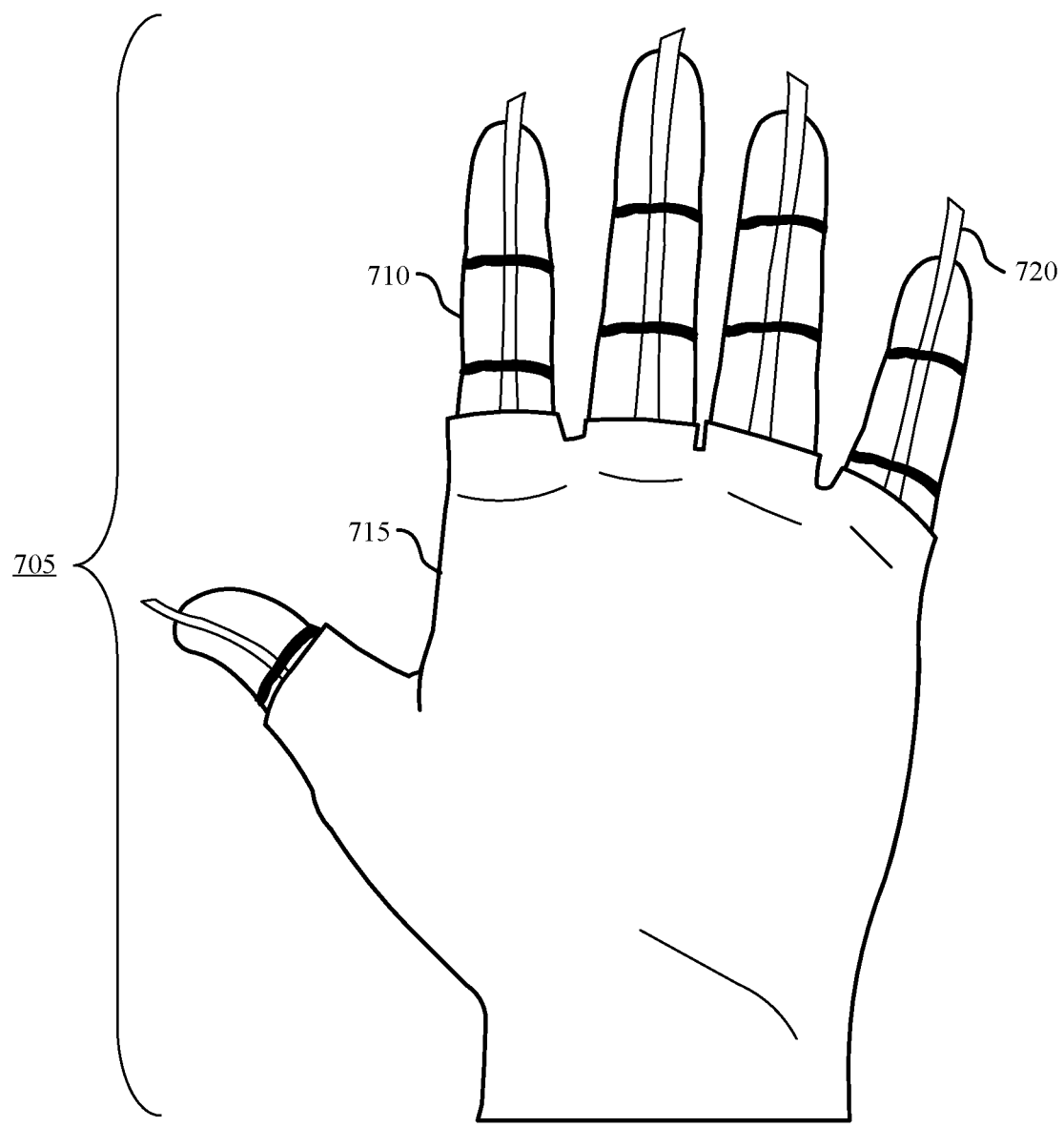
FIG. 7 illustrates an example of a soft glove in accordance with aspects of the present disclosure.

FIG. 7 illustrates an example of a soft glove 705 in accordance with aspects of the present disclosure.

Soft glove 705 may be an example of, or incorporate aspects of, soft glove 115 as described with reference to FIG. 1. In some examples, soft glove 705 may include inner glove 710, outer glove 715, and tendon guide straps 720. In some examples, inner glove 710 may be a replaceable, machine knit glove that fits within outer glove 715.

Figure 8A:
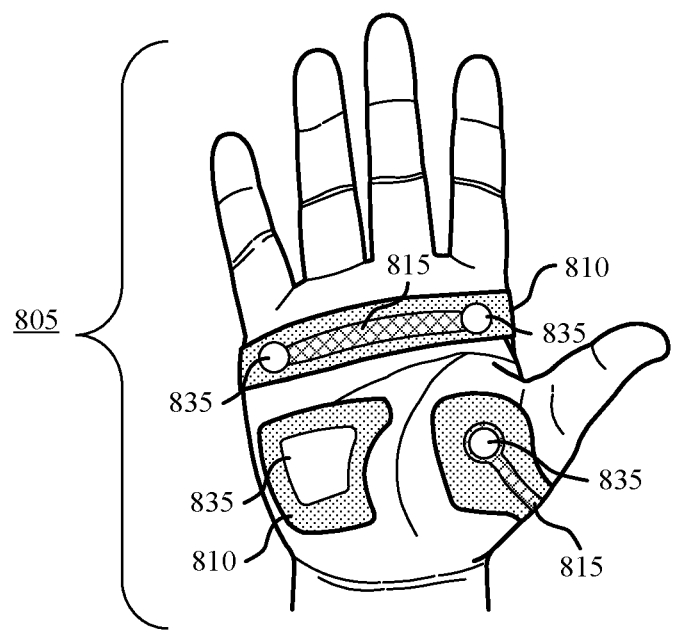
FIGS. 8A and 8B illustrate an example of a palm panel layout in accordance with aspects of the present disclosure.
Figure 8B:
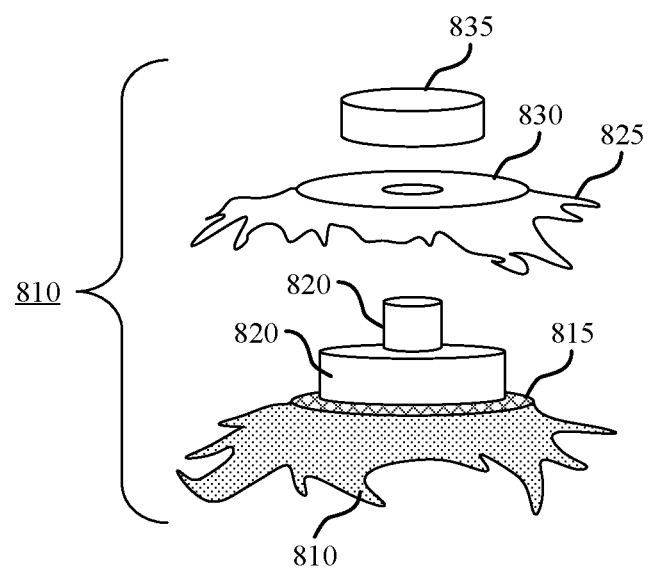

FIGS. 8A and 8B illustrate an example of a palm panel 810 layout that supports providing haptic feedback to a hand 805 using a glove in accordance with aspects of the present disclosure. FIGS. 8A and 8B include illustrations of hand 805 and palm panel 810.

A palm panel 810 may be mechanically interlocked with the haptic feedback glove, which may enable simple construction and maintenance. In some cases, the size of the panels may be different for different glove sizes. In some cases, the palm panels 810 may be bonded to polycarbonate sheets, thermoformed into shape. The boss 820 may be connected to the panel reinforcement using epoxy. The first reinforcement 815 or the second reinforcement 830 may be constructed of thermoplastic.

Hand 805 may be an example of, or incorporate aspects of, hand 505 as described with reference to FIG. 5.

Palm panel 810 may be an example of a palm coupled to the plurality of fingers comprising the flexible fabric 825 material. In some examples, palm panel 810 may include first reinforcement 815, boss 820, fabric 825, second reinforcement 830, and cap 835.

Figure 9:
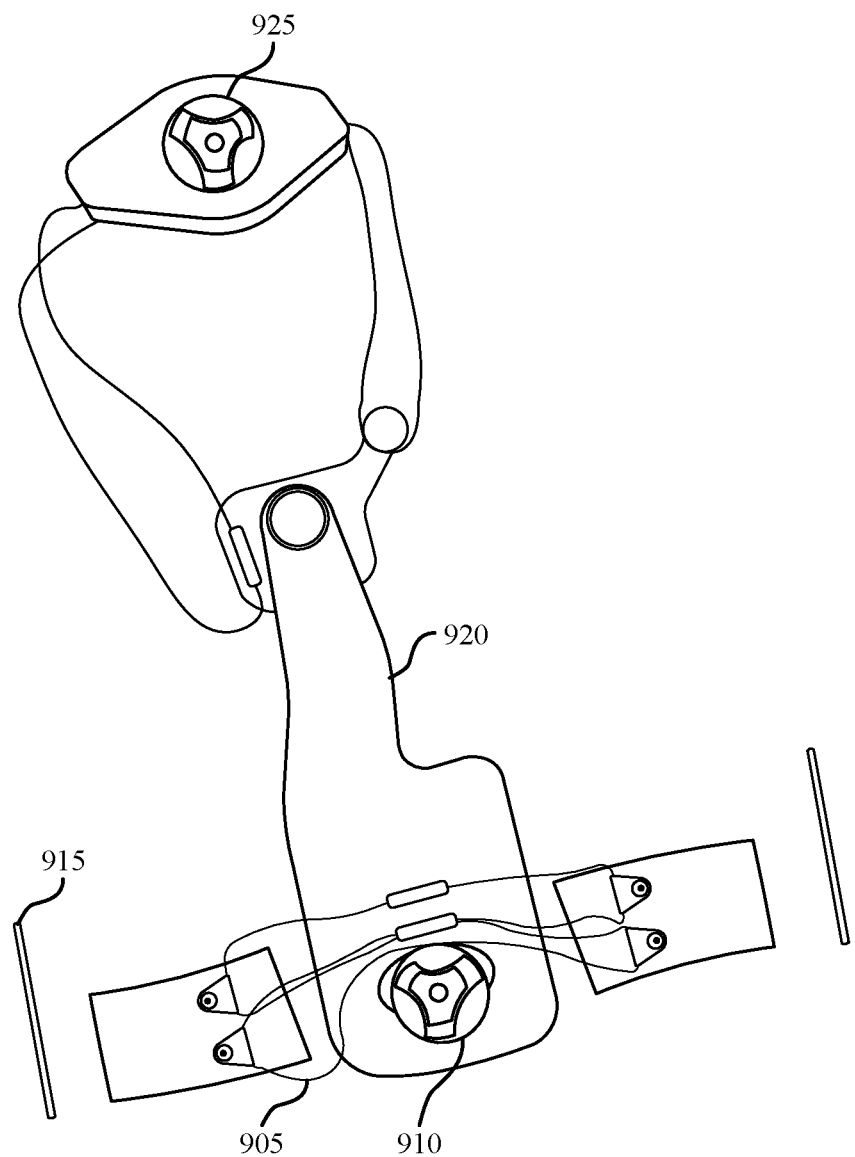
FIG. 9 illustrates an example of a strap assembly in accordance with aspects of the present disclosure.

FIG. 9 illustrates an example of a strap assembly in accordance with aspects of the present disclosure. FIG. 9 includes illustrations of wrist strap 905, wrist lacer 910, retention dowel 915, shank 920, and palm lacer 925.

In some cases, the components of the strap assembly may be connected into a single, removeable unit. The wrist lacer 910 or the palm lacer 925 may be a boa lacer.

Wrist strap 905 may be an example of, or incorporate aspects of, wrist strap 160 as described with reference to FIG. 1.

Wrist lacer 910 may be an example of, or incorporate aspects of, wrist lacer 120 as described with reference to FIG. 1.

Shank 920 may be an example of, or incorporate aspects of, shank 150 as described with reference to FIG. 1.

Palm lacer 925 may be an example of, or incorporate aspects of, palm lacer 155 and 1005 as described with reference to FIGS. 1 and 10.

Figure 10:
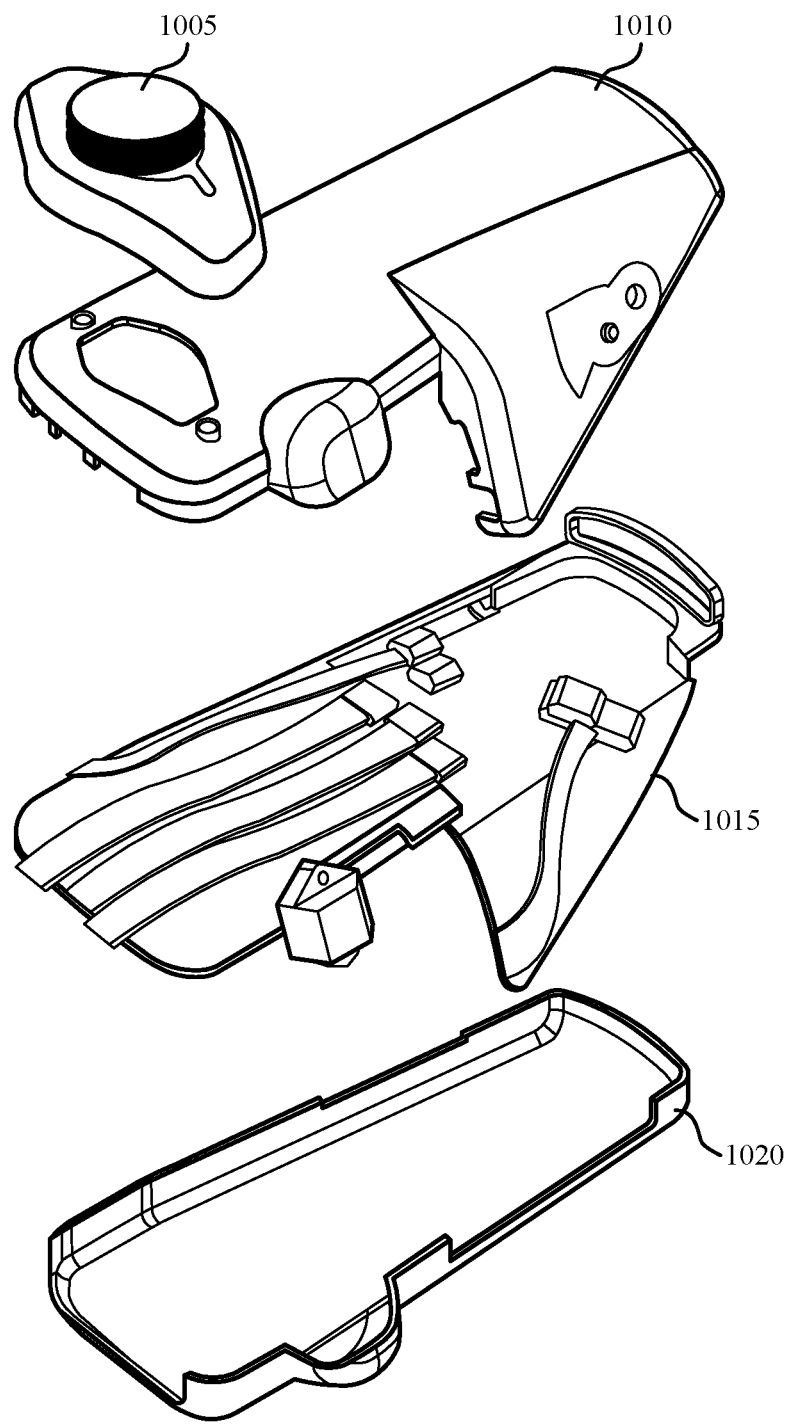
FIG. 10 illustrates an example of a main case assembly in accordance with aspects of the present disclosure.

FIG. 10 illustrates an example of a main case assembly in accordance with aspects of the present disclosure. FIG. 10 includes illustrations of palm lacer 1005, top cover 1010, main case 1015, and bottom cover 1020.

The top cover 1010 may include a removable thumb cover. In some cases, umbilical-routed components may be attached to the main plate. Component mounts may be integrated into main plate. Each component may have an ID tags or serial number to facilitate tracking and assembly. In some cases, the top cover 1010, main plate and bottom cover 1020 may be 3D-printed. In other embodiments injection or soft tooling may be used.

Palm lacer 1005 may be an example of, or incorporate aspects of, palm lacer 155 and 925 as described with reference to FIGS. 1 and 9.

Top cover 1010 may be an example of, or incorporate aspects of, top cover 1110, 1210, 1405, and 1505 as described with reference to FIGS. 11, 12, 14, and 15.

Top cover 1010 may be an example of a back coupled to the plurality of fingers.

Main case 1015 may be an example of, or incorporate aspects of, main case 110 and 1605 as described with reference to FIGS. 1 and 16.

Figure 11:
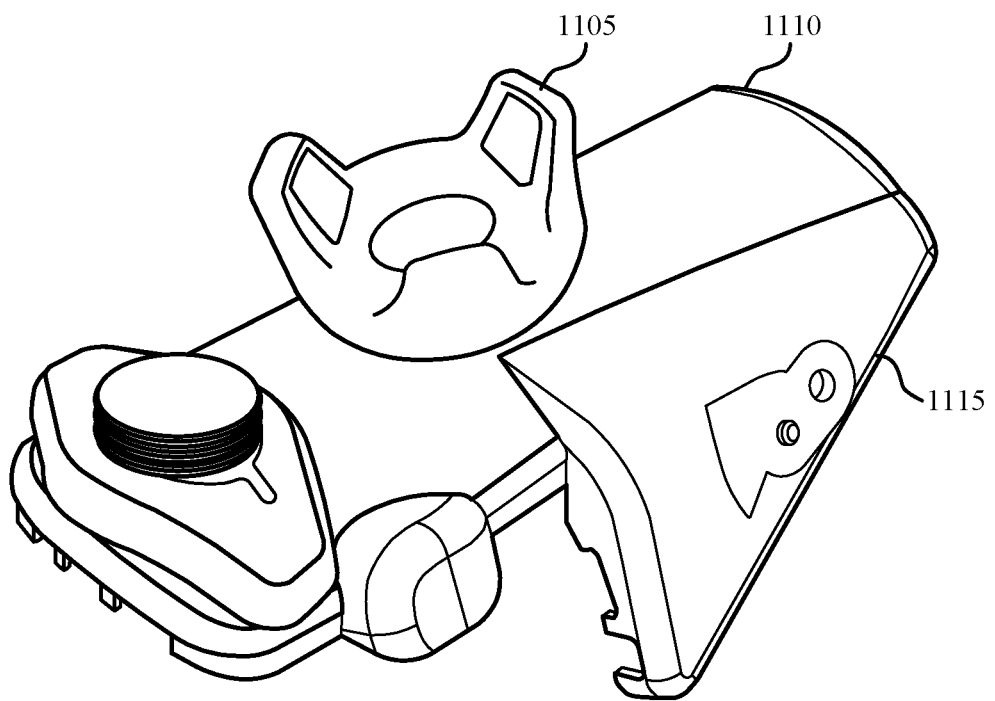
FIG. 11 illustrates an example of a motion capture wrist placement in accordance with aspects of the present disclosure.

FIG. 11 illustrates an example of a motion capture wrist placement in accordance with aspects of the present disclosure. FIG. 11 includes illustrations of motion capture device 1105, top cover 1110, and thumb cover 1115.

A haptic feedback glove may incorporate motion tracking components. Motion tracking software may determine where a user's body is positioned in space to render convincing haptic interactions. Hands are particularly challenging because of their dexterity and small size. In some cases, a motion capture device 1105 may be attached to the top cover 1110. The motion capture device 1105 may be attached via integrated mounting components. In some cases, the motion capture device 1105 may be located behind the wrist to reduce the back-of-hand profile or to improve mass distribution. A motion capture device 1105 may include or be connected to optional sensors located on the wrist, palm or fingers, including on the thumb metacarpal.

Motion capture device 1105 may be an example of, or incorporate aspects of, motion capture device 1205 and 1310 as described with reference to FIGS. 12 and 13.

Top cover 1110 may be an example of, or incorporate aspects of, top cover 1010, 1210, 1405, and 1505 as described with reference to FIGS. 10, 12, 14, and 15.

Thumb cover 1115 may be an example of, or incorporate aspects of, thumb cover 1215, 1410, and 1510 as described with reference to FIGS. 12, 14, and 15.

Figure 12:
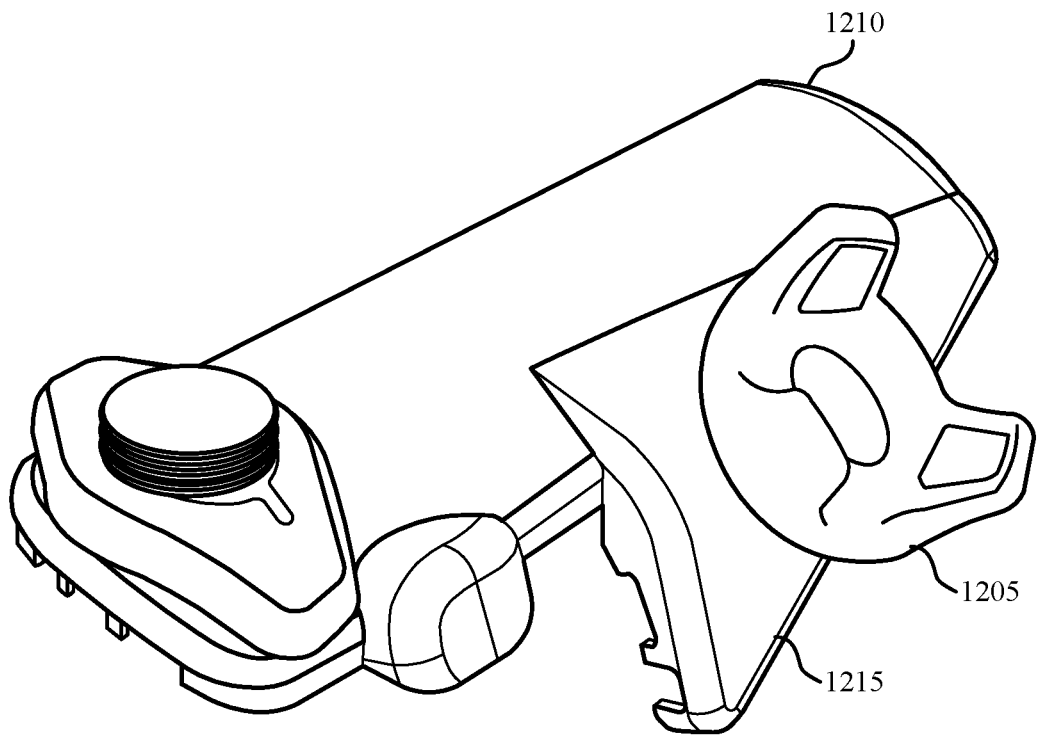
FIG. 12 illustrates an example of a motion capture thumb placement in accordance with aspects of the present disclosure.

FIG. 12 illustrates an example of a motion capture thumb placement in accordance with aspects of the present disclosure. FIG. 12 includes illustrations of motion capture device 1205, top cover 1210, and thumb cover 1215.

Motion capture device 1205 may be an example of, or incorporate aspects of, motion capture device 1105 and 1310 as described with reference to FIGS. 11 and 13.

Top cover 1210 may be an example of, or incorporate aspects of, top cover 1010, 1110, 1405, and 1505 as described with reference to FIGS. 10, 11, 14, and 15.

Thumb cover 1215 may be an example of, or incorporate aspects of, thumb cover 1115, 1410, and 1510 as described with reference to FIGS. 11, 14, and 15. In some cases, a motion capture device 1205 may be attached to the top cover 1210 or the thumb cover 1215

Figure 13:
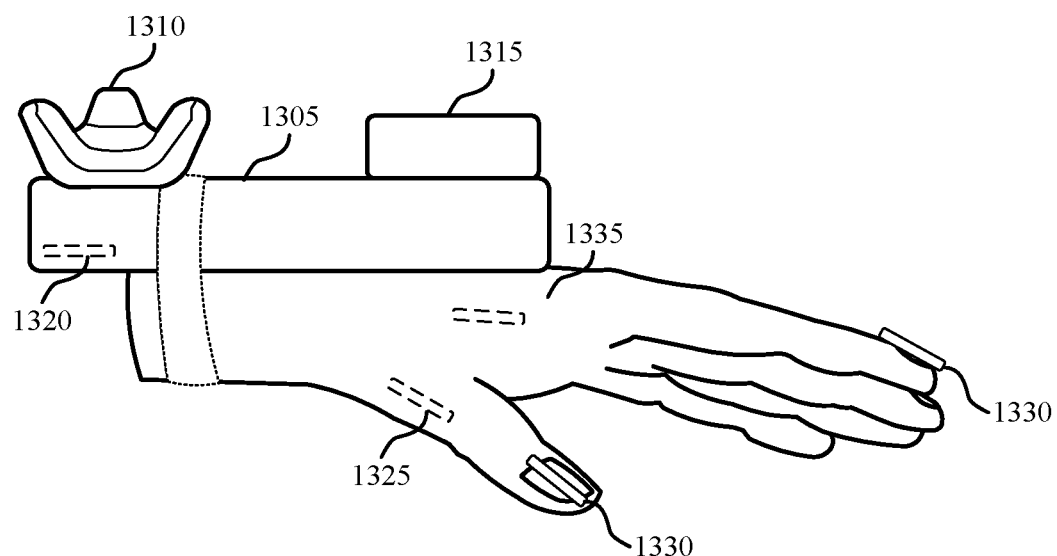
FIG. 13 illustrates an example of a sensor placement in accordance with aspects of the present disclosure.

FIG. 13 illustrates an example of a sensor placement in accordance with aspects of the present disclosure. FIG. 13 includes illustrations of main case assembly 1305, motion capture device 1310, source 1315, forearm sensor 1320, thumb metacarpal sensor 1325, fingertip sensor 1330, and palm sensor 1335.

Motion capture device 1310 may be an example of, or incorporate aspects of, motion capture device 1105 and 1205 as described with reference to FIGS. 11 and 12.

Palm sensor 1335 may be an example of at least one component coupled to a palm, wherein the at least one palm sensor 1335 is configured to wirelessly communicate a position of the palm.

Figure 14:
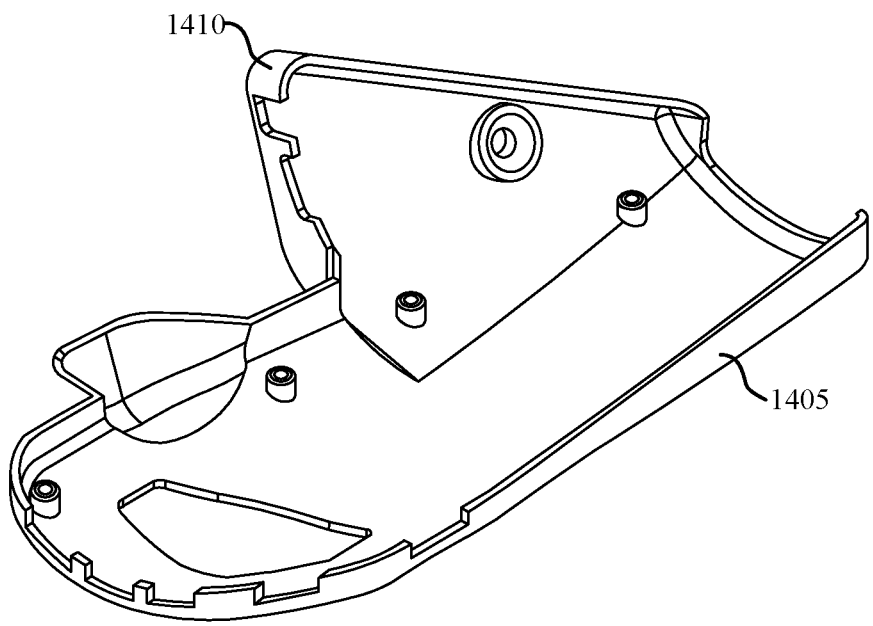
FIG. 14 illustrates an example of an outer perspective view of a top cover in accordance with aspects of the present disclosure.

FIG. 14 illustrates an example of an outer perspective view of a top cover 1405 in accordance with aspects of the present disclosure.

Top cover 1405 may be an example of, or incorporate aspects of, top cover 1010, 1110, 1210, and 1505 as described with reference to FIGS. 10, 11, 12, and 15.

In some examples, top cover 1405 may include thumb cover 1410. Thumb cover 1410 may be an example of, or incorporate aspects of, thumb cover 1115, 1215, and 1510 as described with reference to FIGS. 11, 12, and 15.

Figure 15:
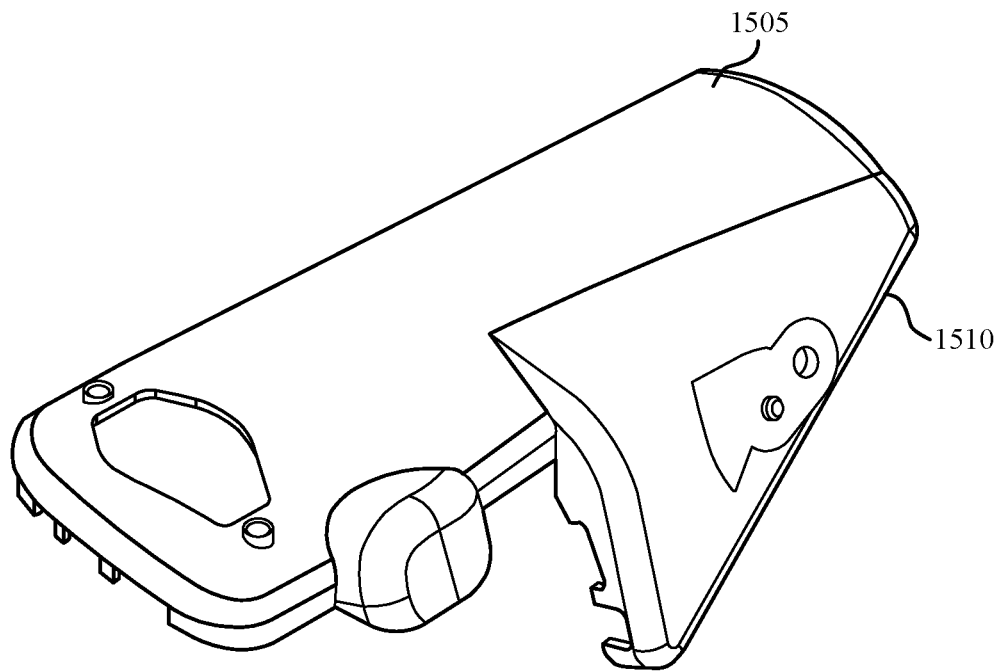
FIG. 15 illustrates an example of an inner perspective view of a top cover in accordance with aspects of the present disclosure.

FIG. 15 illustrates an example of an inner perspective view of a top cover 1505 in accordance with aspects of the present disclosure.

Top cover 1505 may be an example of, or incorporate aspects of, top cover 1010, 1110, 1210, and 1405 as described with reference to FIGS. 10, 11, 12, and 14.

In some examples, top cover 1505 may include thumb cover 1510. Thumb cover 1510 may be an example of, or incorporate aspects of, thumb cover 1115, 1215, and 1410 as described with reference to FIGS. 11, 12, and 14.

Figure 16:
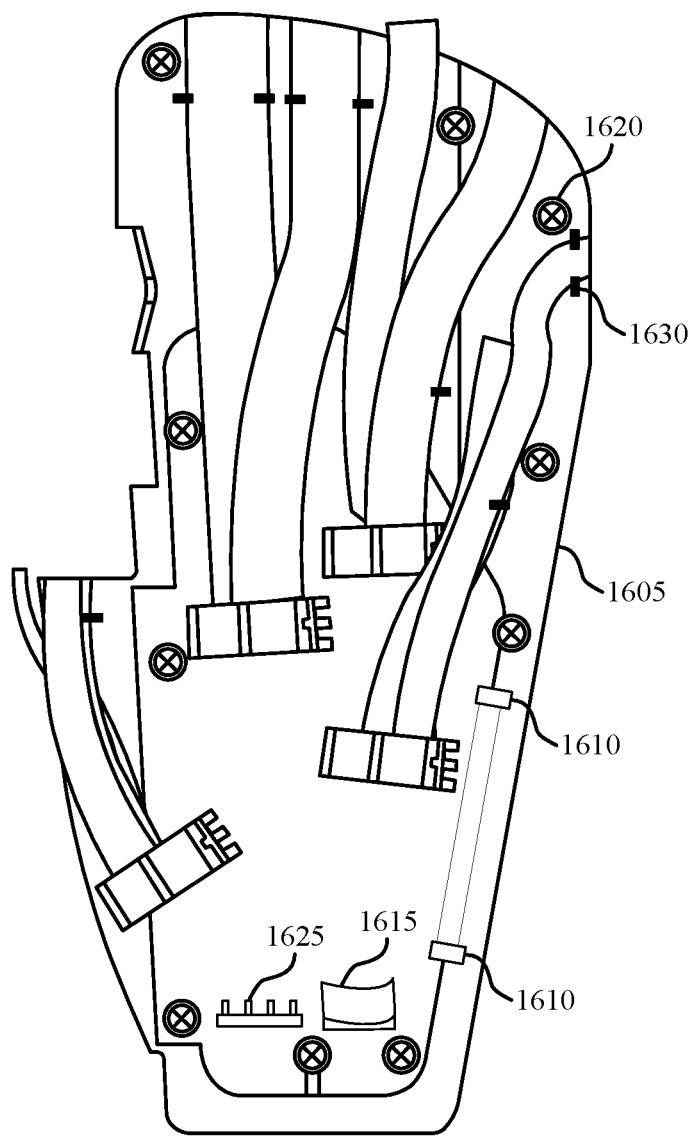
FIG. 16 illustrates an example of a main case in accordance with aspects of the present disclosure.

FIG. 16 illustrates an example of a main case 1605 in accordance with aspects of the present disclosure.

The main case 1605 may include integrated dowel clips 1610 for the attachment of wrist strap dowels, as well as integrated components for the attachment and routing of sensors, wires, straps, and guides. Raised bosses 1620 may provide relief of umbilical strain, and may have threaded inserts.

Main case 1605 may be an example of, or incorporate aspects of, main case 110 and 1015 as described with reference to FIGS. 1 and 10.

In some examples, main case 1605 may include dowel clips 1610, tube retention components 1615, raised bosses 1620, sensor routing components 1625, and panel retention components 1630.

Figure 17:
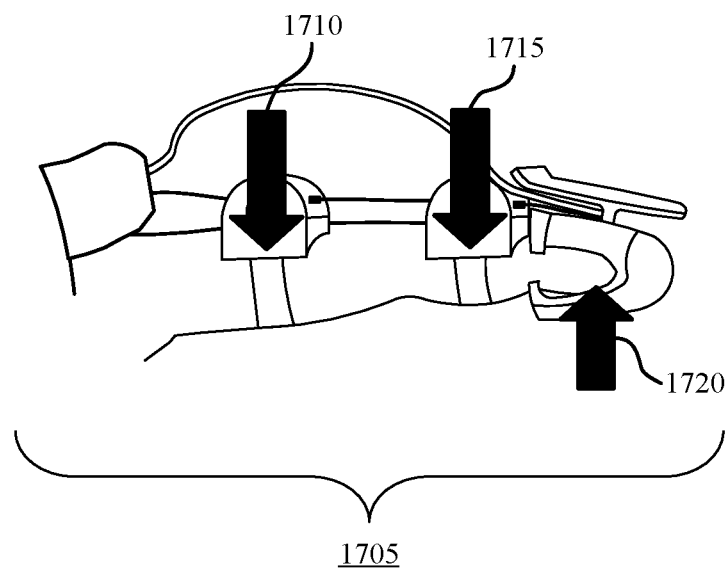
FIG. 17 illustrates an example of a finger force diagram in accordance with aspects of the present disclosure.

FIG. 17 illustrates an example of a finger 1705 force diagram in accordance with aspects of the present disclosure.

In some examples, finger 1705 may include proximal phalanx load 1710, medial phalanx load 1715, and fingertip load 1720.

Figure 18:
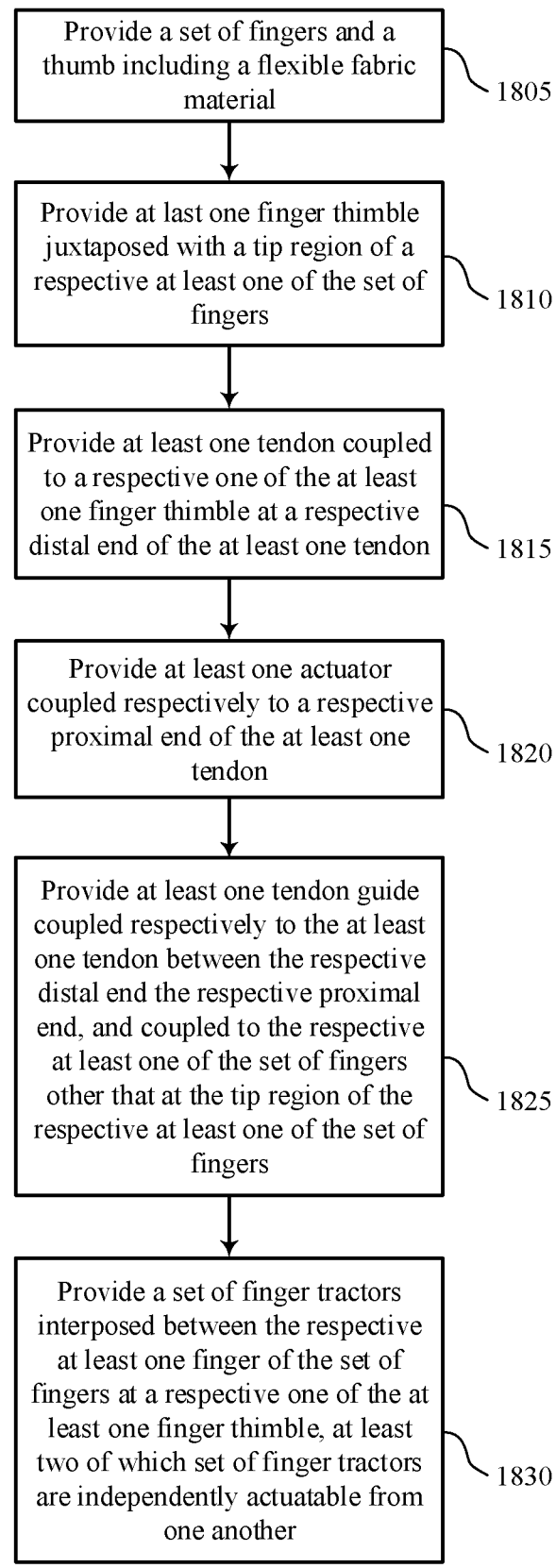
FIG. 18 illustrates an example of a process performed by a manufacturing system for providing a haptic feedback system in accordance with aspects of the present disclosure.

FIG. 18 illustrates an example of a process performed by a manufacturing system for providing a haptic feedback system in accordance with aspects of the present disclosure. In some examples, a manufacturing system may execute a set of codes to control functional elements of the manufacturing system to perform the described functions.

Additionally or alternatively, a manufacturing system may use special-purpose hardware. These operations may be performed according to the methods and processes described in accordance with aspects of the present disclosure. For example, the operations may be composed of various substeps, or may be performed in conjunction with other operations described herein.

At block 1805 the manufacturing system may provide a plurality of fingers and a thumb comprising a flexible fabric material.

At block 1810 the manufacturing system may provide at last one finger thimble juxtaposed with a tip region of a respective at least one of the plurality of fingers.

At block 1815 the manufacturing system may provide at least one tendon coupled to a respective one of the at least one finger thimble at a respective distal end of the at least one tendon.

At block 1820 the manufacturing system may provide at least one actuator coupled respectively to a respective proximal end of the at least one tendon.

At block 1825 the manufacturing system may provide at least one tendon guide coupled respectively to the at least one tendon between the respective distal end the respective proximal end, and coupled to the respective at least one of the plurality of fingers other that at the tip region of the respective at least one of the plurality of fingers.

At block 1830 the manufacturing system may provide a plurality of finger tactors interposed between the respective at least one finger of the plurality of fingers at a respective one of the at least one finger thimble, at least two of which plurality of finger tactors are independently actuatable from one another.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A human-computer interface system comprising:
a fingertip assembly configured to apply a pressure to the finger of a user;
said fingertip assembly including:
a finger panel comprising a plurality of tactors, including:
a tactor configured to apply a pressure to a palmar surface of the finger; and
at least one of:
a tactor configured to apply a pressure to a radial surface of the finger, and
a tactor configured to apply a pressure to an ulnar surface of the finger, and
a tactor configured to apply a pressure to a distal surface of the finger;
a palm coupled to the fingertip assembly comprising a flexible fabric material; and
a plurality of palm tactors coupled to the palm, at least two of said plurality of palm tactors being independently actuatable from one another.

2. The human-computer interface of claim 1, further comprising:
a back coupled to the fingertip assembly; and
a positional tracker coupled to the back configured to communicate a position in three-dimensional space of a hand.

3. The human-computer interface of claim 1, further comprising:
a sensor coupled to the fingertip assembly configured to wirelessly communicate a position of the fingertip assembly.

4. The human-computer interface of claim 3, wherein: the sensor is coupled to a thimble.

5. The human-computer interface of claim 2, further comprising:
at least one palm sensor coupled to a palm, wherein the at least one palm sensor is configured to communicate a position of the palm.

6. The human-computer interface system of claim 1 further comprising a thimble.

7. The human-computer interface system of claim 1 wherein the fingertip assembly is coupled to a force-feedback exoskeleton.

8. The human-computer interface system of claim 1 wherein said fingertip assembly comprises at least 12 independently actuatable tactors.

9. A fingertip assembly for a haptic glove, comprising:
A finger panel including:
- a central portion;
- a left portion coupled to a left side of the central portion; and
- a right portion coupled to a right side of the central portion,
- wherein the central portion, the left portion, and the right portion each contain a tactor, and wherein the left portion and the right portion are configured such that when a fingertip of a user is inserted in the fingertip assembly, the left portion and the right portion are located on either side of the fingertip and all of the tactors are operably coupled to the fingertip.

10. The fingertip assembly of claim 9 further comprising a thimble.

11. The fingertip assembly of claim 9 wherein said fingertip assembly is coupled to a force-feedback exoskeleton.

12. The fingertip assembly of claim 9 wherein said fingertip assembly comprises at least 12 independently actuatable tactors.

13. A palm assembly for a haptic glove, comprising:
a palm panel including a plurality of tactors; and
an assembly configured to operably couple said plurality of tactors to a palm of a user,
said assembly comprising:
- a first material having a higher rigidity,
- coupled to a second material having a lower rigidity by means of a boss proximate to a reinforced portion of said second material.

14. The palm assembly of claim 13 further coupled to a main case.

15. The palm assembly of claim 13 wherein said first material comprises a thermoplastic.

16. The palm assembly of claim 13 wherein said second material comprises a fabric.

17. The palm assembly of claim 13 further comprising a cap configured to secure said second material to the boss.

18. The palm assembly of claim 13 wherein said reinforced portion of said second material comprises a thermoplastic.

19. The palm assembly of claim 13, further comprising:
a back coupled to the palm panel; and
a positional tracker coupled to the back configured to communicate a position in three-dimensional space of a hand.

* * * * *